United States Patent
Li et al.

(10) Patent No.: US 12,452,743 B2
(45) Date of Patent: Oct. 21, 2025

(54) HANDOVER METHOD AND APPARATUS, DEVICES AND STORAGE MEDIUM

(71) Applicant: GUANGDONG OPPO MOBILE TELECOMMUNICATIONS CORP., LTD., Guangdong (CN)

(72) Inventors: Haitao Li, Guangdong (CN); Wenqiang Tian, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 402 days.

(21) Appl. No.: 18/190,482

(22) Filed: Mar. 27, 2023

(65) Prior Publication Data

US 2023/0239747 A1  Jul. 27, 2023

Related U.S. Application Data

(63) Continuation of application No. PCT/CN2020/118190, filed on Sep. 27, 2020.

(51) Int. Cl.
*H04W 36/00* (2009.01)
*H04W 36/12* (2009.01)

(52) U.S. Cl.
CPC ... *H04W 36/0061* (2013.01); *H04W 36/0058* (2018.08); *H04W 36/125* (2018.08)

(58) Field of Classification Search
CPC ......... H04W 36/0061; H04W 36/0058; H04W 36/125; H04W 36/362; H04W 36/0083;
(Continued)

(56) References Cited

U.S. PATENT DOCUMENTS

| | | | | |
|---|---|---|---|---|
| 11,997,556 | B2* | 5/2024 | Yan | H04W 36/362 |
| 2017/0188273 | A1* | 6/2017 | Yiu | H04W 36/04 |
| 2020/0162956 | A1 | 5/2020 | Cui et al. | |

FOREIGN PATENT DOCUMENTS

| | | |
|---|---|---|
| CN | 105430693 | 3/2016 |
| CN | 109982401 | 7/2019 |

(Continued)

OTHER PUBLICATIONS

EPO, Extended European Search Report for EP Application No. 20954690.2, Oct. 6, 2023.

(Continued)

*Primary Examiner* — Hashim S Bhatti
(74) *Attorney, Agent, or Firm* — Hodgson Russ LLP

(57) ABSTRACT

Disclosed are a handover method and apparatus, devices and a storage medium. The method includes: receiving configuration information from a network device, the configuration information including multiple sets of handover configuration information, each set of the multiple sets of handover configuration information being associated with a service situation, and the handover configuration information being used to configure an operation related to cell handover; obtaining a current service situation; determining, from the multiple sets of handover configuration information, target handover configuration information according to the current service situation; and performing the operation related to cell handover according to the target handover configuration information.

18 Claims, 10 Drawing Sheets

(58) Field of Classification Search
CPC .............. H04W 36/30; H04W 36/324; H04W 36/0094
See application file for complete search history.

(56) References Cited

FOREIGN PATENT DOCUMENTS

| CN | 111372293 | 7/2020 |
|---|---|---|
| EP | 3893548 A1 | 10/2021 |
| WO | 2013039434 A1 | 3/2013 |
| WO | 2015164712 A1 | 10/2015 |

OTHER PUBLICATIONS

"3rd Generation Partnership Project; Technical Specification Group Radio Access Network; NR; Radio Resource Control (RRC) protocol specification (Release 16)," 3GPP TS 38.331, Jul. 2020, v16.1.0.
WIPO, International Search Report and Written Opinion for PCT/CN2020/118190, Jul. 1, 2021.

* cited by examiner

HANDOVER METHOD AND APPARATUS, DEVICES AND STORAGE MEDIUM

CROSS-REFERENCE TO RELATED APPLICATION

This application is a continuation of International Application No. PCT/CN2020/118190, filed Sep. 27, 2020, the entire disclosure of which is incorporated by reference herein.

TECHNICAL FIELD

Embodiments of the present disclosure relate to the communication technical field, and more specifically, to a handover method and apparatus, a device and a storage medium.

BACKGROUND

Since terminal devices have mobility, the terminal devices are handed over between different serving cells.

In related arts, a terminal device only considers the signal quality of a cell where the terminal device currently resides and the signal quality of a target cell when performing handover, and the amount of information considered is relatively single, resulting in poor handover effect.

SUMMARY

Embodiments of the present disclosure provide a handover method and apparatus, a device and a storage medium, and a method and apparatus, a device and a storage medium. The technical solutions are as follows.

According to an aspect of embodiments of the present disclosure, there is provided a handover method, applied to a terminal device, and the method including:
  receiving configuration information from a network device, wherein the configuration information includes multiple sets of handover configuration information, each set of the multiple sets of handover configuration information is associated with a service situation, and the handover configuration information is used to configure an operation related to cell handover;
  obtaining a current service situation;
  determining, from the multiple sets of handover configuration information, target handover configuration information according to the current service situation; and
  performing the operation related to cell handover according to the target handover configuration information.

According to an aspect of embodiments of the present disclosure, there is provided a handover method, applied to a network device, and the method including:
  sending configuration information to a terminal device, wherein the configuration information includes multiple sets of handover configuration information, each set of the multiple sets of handover configuration information is associated with a service situation, and the handover configuration information is used to configure an operation related to cell handover.

According to an aspect of embodiments of the present disclosure, there is provided a handover method, applied to a terminal device, and the method including:
  receiving model configuration information from a network device;
  determining a handover model according to the model configuration information, wherein the handover model is used to provide policy information related to cell handover; and
  processing current status information of the terminal device through the handover model to obtain the policy information, wherein the policy information is used to guide the terminal device to perform an operation related to cell handover.

According to an aspect of embodiments of the present disclosure, there is provided a handover method, applied to a network device, and the method including:
  sending, to a terminal device, model configuration information which is used to determine a handover model, wherein the handover model is used to provide policy information related to cell handover, and the policy information is used to guide the terminal device to perform an operation related to cell handover.

According to an aspect of embodiments of the present disclosure, there is provided a handover apparatus, including:
  an information receiving module configured to receive configuration information from a network device, wherein the configuration information includes multiple sets of handover configuration information, each set of the multiple sets of handover configuration information is associated with a service situation, and the handover configuration information is used to configure an operation related to cell handover;
  a situation obtaining module configured to obtain a current service situation;
  a configuration determination module configured to determine, from the multiple sets of handover configuration information, target handover configuration information according to the current service situation; and
  an operation execution module configured to perform the operation related to cell handover according to the target handover configuration information.

According to an aspect of embodiments of the present disclosure, there is provided a handover apparatus, including:
  an information sending module configured to send configuration information to a terminal device, wherein the configuration information includes multiple sets of handover configuration information, each set of the multiple sets of handover configuration information is associated with a service situation, and the handover configuration information is used to configure an operation related to cell handover.

According to an aspect of embodiments of the present disclosure, there is provided a handover apparatus, including:
  a configuration receiving module configured to receive model configuration information from a network device;
  a model determination module configured to determine a handover model according to the model configuration information, wherein the handover model is used to provide policy information related to cell handover; and
  a policy obtaining module configured to process current status information of the terminal device through the handover model to obtain the policy information, wherein the policy information is used to guide the terminal device to perform an operation related to cell handover.

According to an aspect of embodiments of the present disclosure, there is provided a handover apparatus, including:
  a configuration sending module configured to send, to a terminal device, model configuration information which is used to determine a handover model, wherein the handover model is used to provide policy information related to cell handover, and the policy information is used to guide the terminal device to perform an operation related to cell handover.

According to an aspect of embodiments of the present disclosure, there is provided a terminal device, including: a processor and a transceiver connected to the processor; wherein:
- the transceiver is configured to receive configuration information from a network device, wherein the configuration information includes multiple sets of handover configuration information, each set of the multiple sets of handover configuration information is associated with a service situation, and the handover configuration information is used to configure an operation related to cell handover;
- the processor is configured to: obtain a current service situation; determine, from the multiple sets of handover configuration information, target handover configuration information according to the current service situation; and perform the operation related to cell handover according to the target handover configuration information.

According to an aspect of embodiments of the present disclosure, there is provided a network device, including: a processor and a transceiver connected to the processor; wherein:
the transceiver is configured to send configuration information to a terminal device, wherein the configuration information includes multiple sets of handover configuration information, each set of the multiple sets of handover configuration information is associated with a service situation, and the handover configuration information is used to configure an operation related to cell handover.

According to an aspect of embodiments of the present disclosure, there is provided a terminal device, including: a processor and a transceiver connected to the processor; wherein:
- the transceiver is used to receive model configuration information from network device;
- the processor is configured to: determining a handover model according to the model configuration information, wherein the handover model is used to provide policy information related to cell handover; and process current status information of the terminal device through the handover model to obtain the policy information, wherein the policy information is used to guide the terminal device to perform an operation related to cell handover.

According to an aspect of embodiments of the present disclosure, there is provided a network device, including: a processor and a transceiver connected to the processor; wherein:
the transceiver is configured to send, to a terminal device, model configuration information which is used to determine a handover model, wherein the handover model is used to provide policy information related to cell handover, and the policy information is used to guide the terminal device to perform an operation related to cell handover.

According to an aspect of embodiments of the present disclosure, there is provided a computer-readable storage medium, wherein a computer program is stored in the storage medium, and the computer program is used to be executed by a processor of a terminal device to implement the handover method at the terminal device side as described above.

According to an aspect of embodiments of the present disclosure, there is provided a computer-readable storage medium, wherein a computer program is stored in the storage medium, and the computer program is used to be executed by a processor of a network device to implement the handover method at the network device side as described above.

According to an aspect of embodiments of the present disclosure, there is provided a chip. The chip includes a programmable logic circuit and/or program instructions for implementing the handover method at the terminal device side as described above when the chip runs on the terminal device.

According to an aspect of embodiments of the present disclosure, there is provided a chip. The chip includes a programmable logic circuit and/or program instructions for implementing the handover method at the network device side as described above when the chip runs on the network device.

According to an aspect of embodiments of the present disclosure, there is provided a computer program product. When the computer program product is run on a processor of a terminal device, the terminal device is caused to perform the handover method at the terminal device side as described above.

According to an aspect of embodiments of the present disclosure, there is provided a computer program product. When the computer program product is run on a processor of a network device, the network device is caused to perform the handover method at the network device side as described above.

The technical solution provided in embodiments of the present disclosure may include the following beneficial effects.

On the one hand, by configuring multiple sets of handover configuration information for different service situations, each set of handover configuration information is associated with a service situation, so that the terminal device, when performing an operation related to cell handover (such as measurement reporting evaluation or handover execution condition evaluation), can select target handover configuration information adapted to the current service situation in combination with the current service situation to guide the terminal device to perform the operation related to cell handover. This makes the handover procedure more suitable for the current actual service situation (such as service type or service QoS characteristic) and improves the handover effect.

On the other hand, by introducing the handover model, the handover model generates a local handover decision adapted to the terminal device based on the current status information of the terminal device (such as a measurement result, speed information, service information, QoS information, etc.), so that the handover procedure is more adapted to the current actual service situation and the handover effect is improved.

DETAILED DESCRIPTION

In order to make the purpose(s), technical solution(s) and advantage(s) of the present disclosure clearer, the implementations of the present disclosure will be further described in detail below in conjunction with the accompanying drawings.

The network architectures and service scenarios described in the embodiments of the present disclosure are for more clearly illustrating the technical solutions of the embodiments of the present disclosure, and do not constitute limitations on the technical solutions provided by the embodiments of the present disclosure. One of ordinary skill in this art will understand that, in view of the evolution of the structures and the emergence of new service scenarios, the technical solutions provided by the embodiments of the present disclosure are also applicable to similar technical problems.

Figure 1:
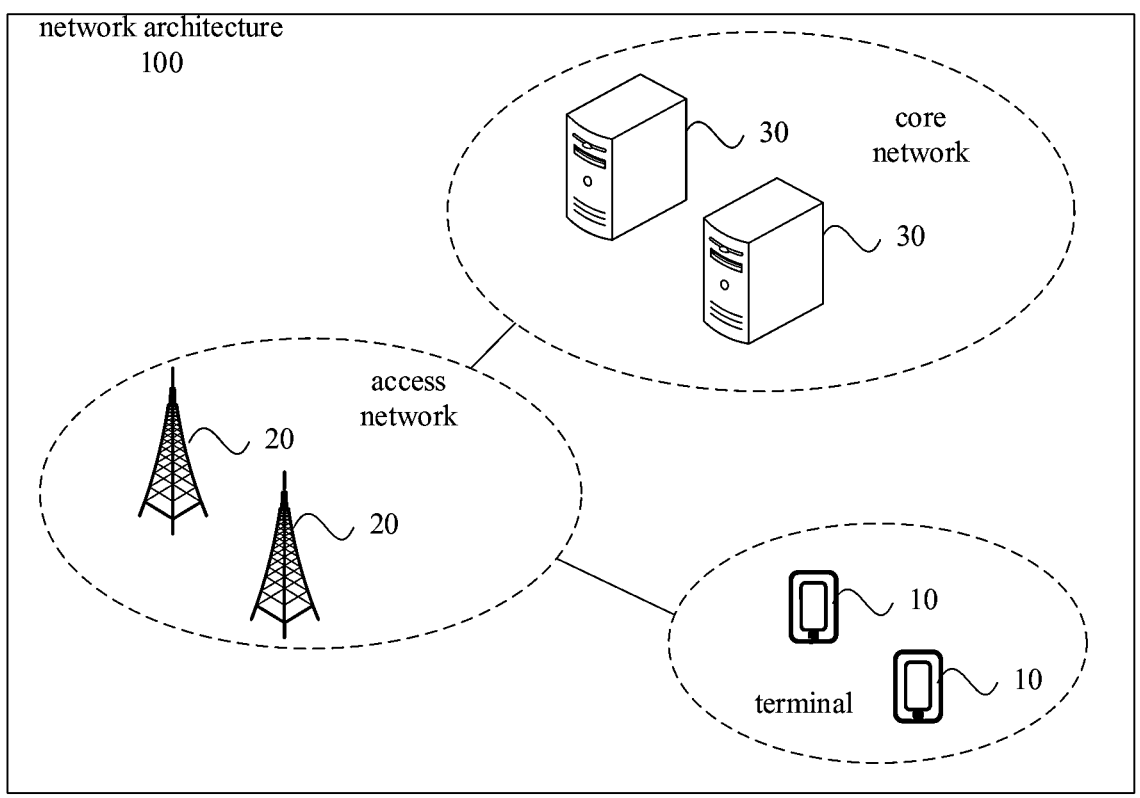
FIG. 1 is a schematic diagram of a network architecture according to an embodiment of the present disclosure.

FIG. 1 shows a schematic diagram of a network architecture according to an embodiment of the present disclosure. The network architecture may include: a terminal device 10, an access network device 20 and a core network device 30.

The terminal device 10 may refer to a User Equipment (UE), an access terminal, a subscriber unit, a subscriber station, a mobile station, a mobile terminal, a remote station, a remote terminal, a mobile device, a wireless communication device, a user agent, or a user device. Optionally, the terminal device 10 may also be a cellular phone, a cordless phone, a Session Initiation Protocol (SIP) phone, a Wireless Local Loop (WLL) station, a Personal Digital Assistant (PDA, a handheld device with wireless communication functions, a computing devices or other processing device connected to a wireless modem, a vehicle-mounted device, a wearable device, a terminal device in 5th Generation System (5GS, fifth mobile communication system) or a terminal device in a future evolved Public Land Mobile Network (PLMN), etc., which are not limited in the embodiments of the present disclosure. For convenience of description, the devices mentioned above are collectively referred to as terminal devices. The number of terminal devices 10 is generally multiple, and one or more terminal devices 10 may be distributed in a cell managed by each access network device 20.

The access network device 20 is a device deployed in an access network to provide a wireless communication function for the terminal devices 10. The access network device 20 may include various forms including a macro base station, a micro base station, a relay station, an access point, and so on. In systems using different radio access technologies, the name of the device with access network device functions may be different. For example, in a 5G NR system, it is called gNodeB or gNB. With the evolution of communication technologies, the name "access network device" may change. For the convenience of description, in the embodiments of the present disclosure, the above-mentioned devices that provide the wireless communication functions for the terminal devices 10 are collectively referred to as access network devices. Optionally, a communication relationship may be established between the terminal devices 10 and the core network device 30 through the access network device 20. Exemplarily, in an Long Term Evolution (LTE) system, the access network device 20 may be Evolved Universal Terrestrial Radio Access Network (EUTRAN) or one or more eNodeBs in EUTRAN. In the 5G NR system, the access network device 20 may be a Radio Access Network (RAN) or one or more gNBs in the RAN. In the embodiments of the present disclosure, the network device refers to the access network device 20 unless otherwise specified.

The functions of the core network device 30 are mainly to provide user connections, manage users, and bearer services, and provide an interface to external networks as a bearer network. For example, the core network device in the 5G NR system may include an Access and Mobility Management Function (AMF) entity, a User Plane Function (UPF) entity, and a Session Management Function (SMF) entity and so on.

In an example, the access network device 20 and the core network device 30 communicate with each other through a certain air interface technology, such as an NG interface in a 5G NR system. The access network device 20 and the terminals 10 communicate with each other through a certain air interface technology, such as a Uu interface.

The "5G NR system" in the embodiments of the present disclosure may also be called a 5G system or an NR system, but those skilled in the art can understand its meaning. The technical solutions described in the embodiments of the present disclosure may be applied to the 5G NR system, and may also be applied to a subsequent evolution system of the 5G NR system.

A communication system usually supports a handover procedure of a terminal device in a connected state. When a user who is using a network service moves from one cell to another, or due to reasons such as wireless transmission service load adjustment, activation operation maintenance, equipment failure, etc., in order to ensure the continuity of communication and the quality of service, the system will transfer the communication link between the user and the original cell to a new cell, that is, the handover procedure is performed. Therefore, the terminal device may be handed over from a cell of a first access network device to a cell of a second access network device. In this case, the first access network device may be called a source access network device or a source base station, and the second access network device may be called a target access network device or a target base station.

Figure 2:
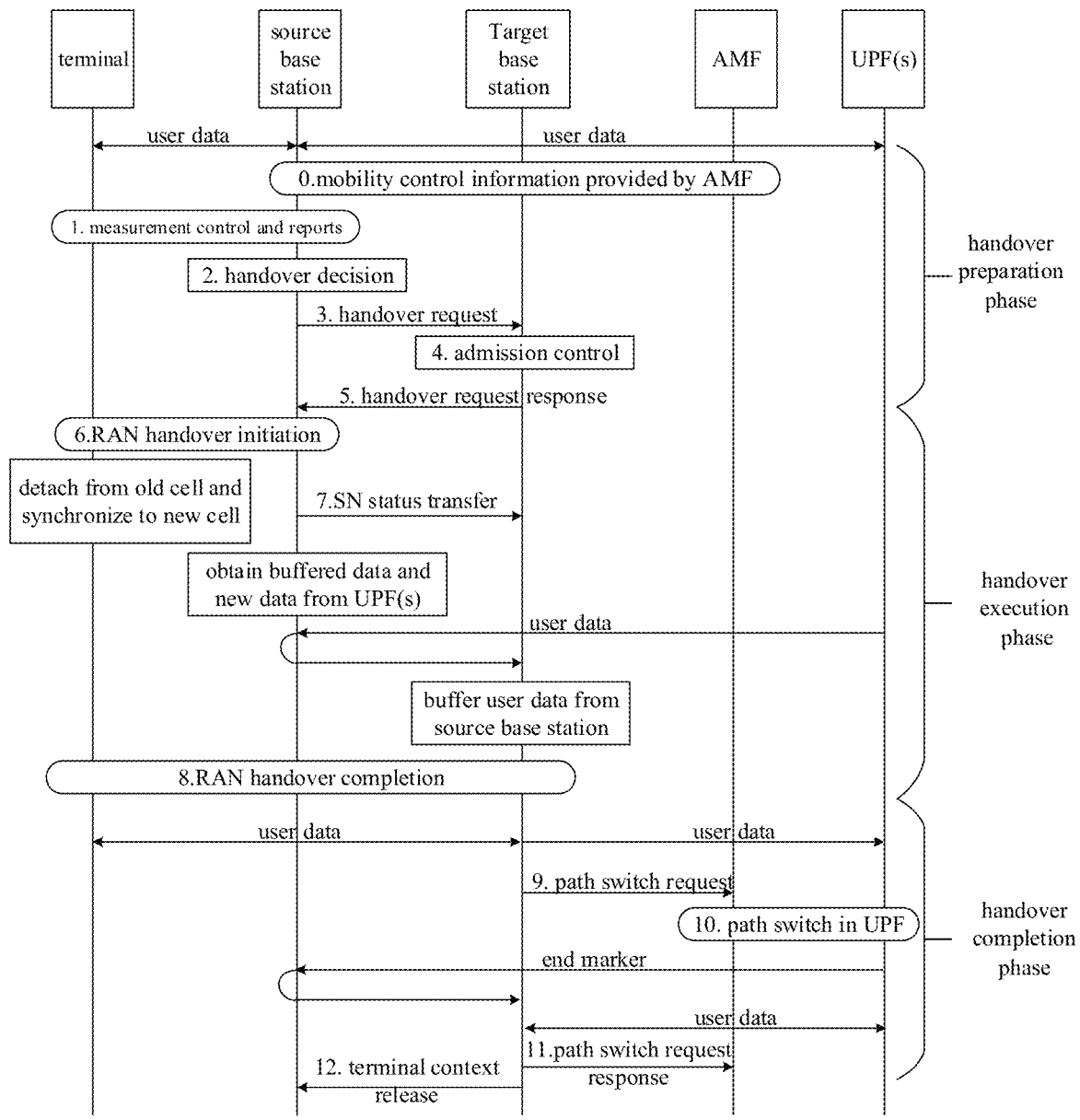
FIG. 2 is a schematic diagram of a terminal handover procedure according to related arts.

FIG. 2 shows a schematic diagram of a terminal handover procedure provided in related arts.

In a handover preparation phase, an AMF provides mobility control information to a base station, and measurement control and reporting are performed between a terminal device and the source base station. After the source base station makes a handover decision according to the measurement report of the terminal device, it sends a handover request (Handover Request) to a target base station. The target base station performs admission control, and if it is determined that the handover of the terminal device is allowed, the target base station sends a handover request response (Handover Request Acknowledge) to the source base station.

In a handover execution phase, an RAN handover is initiated, and the terminal device detaches from the old cell and synchronizes to the new cell. The source base station sends an SN (Serial Number) status transfer (SN Status Transfer) to the target base station. The source base station obtains buffered data and new data from the UPF, and then sends the above user data to the target base station. The target base station buffers user data from the source base station. So far, the RAN handover is completed.

In a handover completion phase, the target base station sends a path switch request (Path Switch Request) to the AMF, and the AMF and UPF perform the path switch, and then the UPF sends end indication information (End Marker) to the source base station, and the source base station forwards the end indication information to the target base station. The AMF sends a path switch request response (Path Switch Request Acknowledge) to the target base station, and the target base station indicates the source base station to release the context information of the terminal device.

For the handover procedure shown in FIG. 2, in terms of network implementation, the source base station may initiate handover preparation/request messages for multiple target cells (this may be based on the direct X2/Xn interface, or through the S1/N2 interface with the Mobility Management Entity (MME)/AMF) at the same time or successively according to the measurement report from the terminal device side (including the measurement results of multiple cells). Each target cell performs access control according to its own Radio Resource Management (RRM) algorithm after receiving a handover preparation/request message, and sends a handover request response message to the base station where the source cell is located on the premise of passing the access control (if the access control fails, the response message is a handover request failure message). The handover request response message carries a handover command generated by the target cell. The source base station selects one of the multiple target cells that return the handover responses according to its own RRM algorithm as the final handover target cell, and sends the handover command corresponding to the target cell through a Radio Resource Control (RRC) reconfiguration message to the terminal device, and then realize the complete control of the network over the handover procedure.

Figure 3:
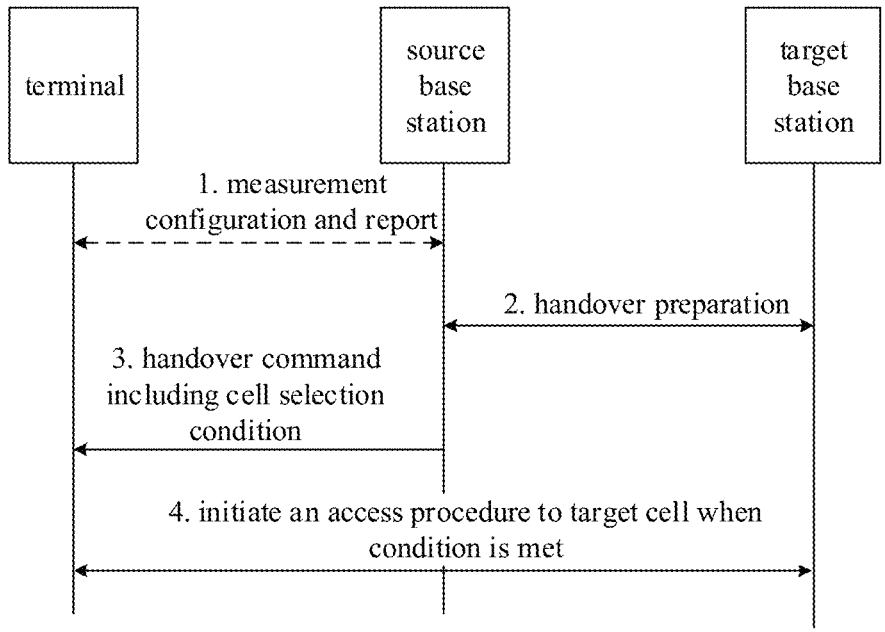
FIG. 3 is a flowchart of a condition-triggered handover procedure according to the related arts.

FIG. 3 shows a flowchart of a condition-triggered handover (conditional handover) procedure.

In view of the problems of frequent handover and that handover is easy to fail in high-speed mobile scenarios and high-frequency deployment scenarios, relevant standard organizations have introduced a condition-based handover procedures for LTE and NR systems. The basic principle is that: when a terminal device evaluates, according to a condition configured by a network side, that a condition related to a target cell is triggered, the terminal device executes handover to the target cell according to a pre-configured handover command (i.e., a random access procedure is triggered and a handover competition message is sent). This can avoid the problem that it is too late or unable to send a measurement report and receive a handover command due to high-speed movement into an area with poor coverage. In the current standard protocol(s), measurement events A3 and/or A5 are defined as trigger conditions for conditional handover.

As shown in FIG. 3, in the condition-based handover procedure, measurement configuration and reporting may be performed between the terminal device and the source base station (this step is an optional step), and then handover preparation is performed between the source base station and the target base station. The source base station sends a handover command to the terminal device, the handover command includes a cell selection condition, and the terminal device initiates an access process to a target base station in the target cell when detecting that the target cell meets the cell selection condition.

Measurement events defined in the current standard include the following:

Measurement event A1 (Event A1): indicates that the signal quality of the serving cell is higher than a certain threshold. When an event meeting this condition is reported, the base station stops inter-frequency/inter-system measurement.

Measurement event A2 (Event A2): indicates that the signal quality of the serving cell is lower than a certain threshold. When an event meeting this condition is reported, the base station starts inter-frequency/inter-system measurement.

Measurement event A3 (Event A3): indicates that the quality of an intra-frequency/inter-frequency neighboring cell is higher than that of the serving cell. When an event meeting this condition is reported, the source base station initiates an intra-frequency handover request. Generally speaking, this is a coverage-based handover.

Measurement event A4 (Event A4): indicates that the quality of an inter-frequency neighboring cell is higher than a certain threshold. When an event meeting this condition is reported, the source base station initiates an inter-frequency handover request. Generally speaking, this is a load balancing-based handover.

Measurement event A5 (Event A5): indicates that the quality of the serving cell is lower than a certain threshold and the quality of a neighboring cell is higher than a certain threshold.

Measurement event B1 (Event B1): indicates that the quality of an inter-system neighboring cell is higher than a certain threshold. When an event meeting this is reported, the source base station initiates an inter-system handover request.

Measurement event B2 (Event B2): indicates that the quality of the serving cell is lower than a certain threshold and the quality of an inter-system neighboring cell is higher than a certain threshold.

With people's increasing requirements on speed, delay, high-speed mobility, energy efficiency, and the diversity and complexity of services in future life, relevant standard organizations have begun to develop 5G. The main application scenarios of 5G include: Enhanced Mobile Broadband (eMBB), Ultra-reliable and Low Latency Communication (URLLC), and Massive Machine Type Communication (mMTC).

eMBB still aims at users' access to multimedia content, services and data, and demand for eMBB is growing rapidly. On the other hand, since eMBB may be deployed in different scenarios, such as indoors, urban areas, and rural areas, the capabilities and requirements are quite different. Thus, no generalizations can be made, and detailed analysis may be combined with specific deployment scenarios. Typical applications of URLLC include: industrial automation, power automation, telemedicine operations (surgery), traffic safety assurance, etc. The typical characteristics of mMTC include: high connection density, small data volume, delay-insensitive services, low cost and long service life of modules, etc.

However, the current mobility management (such as handover) ensures service continuity through the judgment of signal quality (such as measurement event A3 or A5), that is, it is assumed that the continuity of signal quality represents the continuity of user services. However, user service experience is not necessarily equivalent to user service continuity, and user service continuity is not necessarily equivalent to signal quality continuity. User service experience should be related to service QoS (Quality of Service) requirement. Different user services have different mobility management goals (for example, eMBB pursues large bandwidth, URLLC pursues low latency, and mMTC pursues low energy consumption, etc.). In the future, it is needed to introduce more precise control for mobility management according to the different QoS requirements of various services.

A technical solution provided by an embodiment of the present disclosure mainly considers a current service situation (such as a service type or a service QoS characteristic) of a terminal device to determine the measurement report evaluation and handover execution condition evaluation, so that the handover procedure is more suitable for the current situation, thereby improving the handover effect.

In another technical solution provided by an embodiment of the present disclosure, a handover model is introduced. The handover model generates a local handover decision adapted to the terminal device based on the current status information of the terminal device (such as a measurement result, speed information, service information, QoS information, etc.), so that the handover procedure is more adapted to the current actual service situation and the handover effect is improved.

Figure 4:
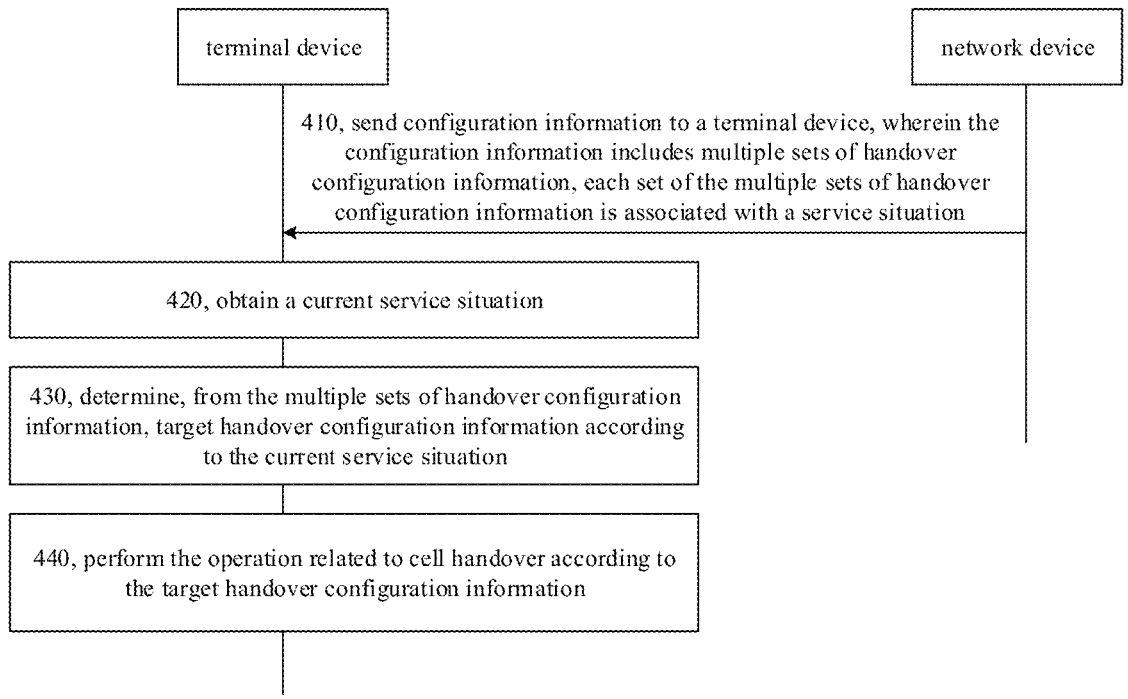
FIG. 4 is a flowchart of a handover method according to an embodiment of the present disclosure.

FIG. 4 is a flowchart of a handover method according to an embodiment of the present disclosure. The method may be applied to the network architecture shown in FIG. 1. The method may include the following steps (410~440):

In step 410, a network device sends configuration information to a terminal device. The configuration information includes multiple sets of handover configuration information, and each set of the multiple sets of handover configuration information is associated with a service situation.

In an embodiment of the present disclosure, the handover configuration information is used to configure an operation related to cell handover. For example, the handover configuration information may include measurement configuration information, and the measurement configuration information is used to configure a measurement reporting operation of the terminal device. For another example, the handover configuration information may include a handover execution condition, and the handover execution condition is used to configure a condition that needs to be met to trigger cell handover in a conditional handover scenario.

In an embodiment of the present disclosure, different handover configuration information is respectively configured for different service situations. The service situation refers to relevant situation of a service processed by the terminal device.

In one example, each service case includes a service type or a combination of multiple service types. For example, a variety of different service types may be classified according to different service characteristics. Exemplarily, the service type includes at least one of the following: an eMBB service, a URLLC service, and/or a mMTC service. Of course, in some other embodiments, service types may also be divided from different dimensions or granularities, such as including a voice service, a video service, an automatic driving service, a telemedicine service, an industrial automation service, etc., which are not limited in embodiments of the present disclosure.

Exemplarily, the configuration information includes multiple sets of handover configuration information as follows: handover configuration information 1 is associated with an eMBB service, handover configuration information 2 is associated with an URLLC service, handover configuration information 3 is associated with a mMTC service, and handover configuration information 4 is associated with a combination of an eMBB service and a mMTC service, etc.

In another example, each service situation includes a QoS characteristic or a combination of multiple QoS characteristics. QoS characteristics may be related to factors such as latency, throughput, or packet loss rate, and so on. Among the different QoS characteristics, there is a characteristic difference of at least one influencing factor. For example, different QoS characteristics have different latency requirements.

Exemplarily, the configuration information includes multiple sets of handover configuration information as follows: handover configuration information 1 is associated with QoS characteristic 1, handover configuration information 2 is associated with QoS characteristic 2, handover configuration information 3 is associated with QoS characteristic 3, handover configuration information 4 is associated with QoS characteristic 1 and QoS characteristic 2, etc.

Correspondingly, the terminal device receives configuration information from the network device.

In step 420, the terminal device obtains a current service situation.

The current service situation refers to relevant situation of a service processed by the terminal device at the current moment.

In step 430, the terminal device determines target handover configuration information from the multiple sets of handover configuration information according to the current service situation.

Optionally, the target handover configuration information is one set of handover configuration information determined from the above multiple sets of handover configuration information.

Optionally, the terminal device determines, from multiple sets of handover configuration information, handover configuration information associated with the current service situation as the target handover configuration information.

Taking a situation where each set of handover configuration information is associated with a service situation, and each service situation includes a service type or a combination of multiple service types as an example, combined with the above example(s), assuming that the current service situation of the terminal device is an URLLC service, then the handover configuration information 2 is determined the target handover configuration information; or, assuming that the current service condition of the terminal device is a combination of an eMBB service and a mMTC service, then it is determined that the handover configuration information 4 is the target handover configuration information.

Taking a situation where each set of handover configuration information is associated with a service situation and each service situation includes a QoS characteristic or a combination of multiple QoS characteristics as an example, combined with the above example(s), assuming that the current service situation of the terminal device is QoS characteristic 1, the handover configuration information 1 is determined as the target handover configuration information; or, assuming that the current service condition of the terminal device is a combination of QoS characteristic 1 and QoS characteristic 2, handover configuration information 4 is determined as the target handover configuration information.

Optionally, if there is no handover configuration information associated with the current service situation, the terminal device may determine, from multiple sets of handover configuration information, handover configuration information with the highest matching degree with the current service situation as the target handover configuration information. For example, the current service situation is a combination of an eMBB service and an URLLC service, and there is no handover configuration information directly related to the combination of the eMBB service and the URLLC service among the multiple sets of handover configuration information configured by the network device. The terminal device may select handover configuration information associated with the URLLC service (that is, the handover configuration information 2 above) as the target handover configuration information. It should be noted that, in the case where there is no handover configuration information associated with the current service situation, the selection method of the target handover configuration information may be configured by the network device and indicated to the terminal device. For example, the above configuration information further carries relevant information to indicate to the terminal device. Alternatively, the selection method of the target handover configuration information may be determined by the terminal device itself. Embodiments of the present disclosure do not impose specific limitations on this.

In step 440, the terminal device performs an operation related to cell handover according to the target handover configuration information.

After the terminal device determines the target handover configuration information suitable for the current service situation from the multiple sets of handover configuration information, the terminal device may perform the operation related to cell handover according to the target handover configuration information.

In view of the above, in the technical solutions provided by embodiments of the present disclosure, multiple sets of handover configuration information are configured for different service situations, and each set of handover configuration information is associated with a service situation. Accordingly, when the terminal device performs an operation related to cell handover (such as measurement reporting evaluation or handover execution condition evaluation), the terminal device may select target handover configuration information suitable for the current service situation by considering the current service situation, so as to guide the terminal device to perform the operation related to cell handover. Thus, the handover procedure is more suitable for the current actual service situation (such as service type or service QoS characteristic), thereby improving the handover effect.

It has been introduced above that the handover configuration information may include measurement configuration information or a handover execution condition. The two cases are described below through two embodiments shown in FIG. 5 and FIG. 6.

Figure 5:
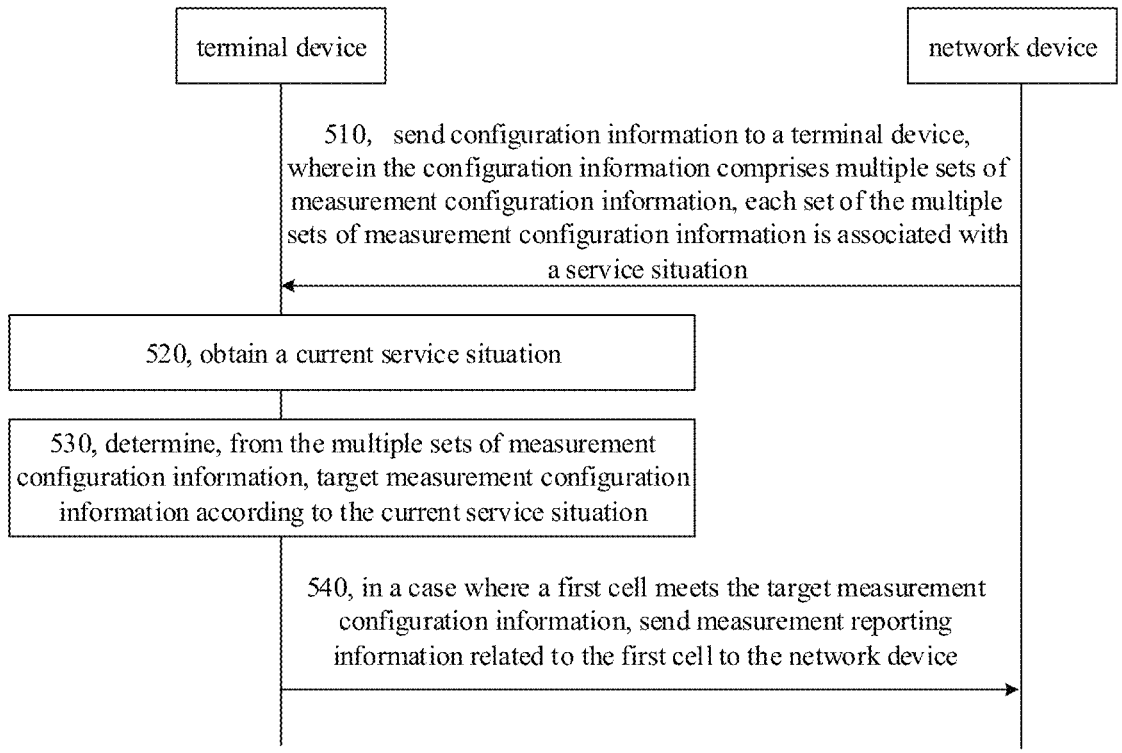
FIG. 5 is a flowchart of a handover method according to another embodiment of the present disclosure.

FIG. 5 is a flowchart of a handover method according to another embodiment of the present disclosure. The method may be applied to the network architecture shown in FIG. 1. The method may include the following steps (510~540):

In step 510, the network device sends configuration information to the terminal device. The configuration information includes multiple sets of measurement configuration information, and each set of measurement configuration information is associated with a service condition.

The measurement configuration information is used to configure the measurement reporting operation of the terminal device. For example, the terminal device may perform measurement reporting evaluation according to the measurement configuration information, such as deciding whether to perform measurement reporting and for which cell or cells to perform measurement reporting.

Optionally, the measurement configuration information includes a measurement event. The measurement event is used to indicate an event that needs to be met for performing the measurement reporting operation. For example, different measurement configuration information may include different measurement events or different combinations of measurement events. The measurement event(s) may be the measurement event(s) listed above, or some measurement events that may be expanded according to actual needs, and embodiments of the present disclosure do not impose specific limitations on this.

In addition, in an embodiment, each service situation may include a service type or a combination of multiple service types, or may also include a QoS characteristic or a combination of multiple QoS characteristics. For related descriptions, please refer to the implementations above, and repeated descriptions are omitted here.

Correspondingly, the terminal device receives configuration information from the network device.

In step 520, the terminal device obtains a current service situation.

In step 530, the terminal device determines target measurement configuration information from multiple sets of measurement configuration information according to the current service situation.

Optionally, the target measurement configuration information is one set of measurement configuration information determined from the above multiple sets of measurement configuration information.

Optionally, the terminal device determines, from multiple sets of measurement configuration information, measurement configuration information associated with the current service situation as the target measurement configuration information. In addition, if there is no measurement configuration information associated with the current service situation, measurement configuration information with the highest degree of matching with the current service situation is determined as the target measurement configuration information from the multiple sets of measurement configuration information.

In step 540, in a case where a first cell meets the target measurement configuration information, the terminal device sends measurement report information related to the first cell to the network device.

After the terminal device determines the target measurement configuration information suitable for the current service situation from the multiple sets of measurement configuration information, the terminal device may perform measurement reporting evaluation according to the target measurement configuration information. In a case where the first cell meets the target measurement configuration information, the terminal device sends the measurement reporting information related to the first cell to the network device. For example, the measurement reporting information may include information such as the identity and signal quality of the first cell, and embodiments of the present disclosure do not impose specific limitations on this.

In view of the above, in the technical solutions provided by embodiments of the present disclosure, for a scenario where handover is performed immediately after the measurement is reported, in combination with the current service situation of the terminal device (such as service type or service QoS characteristic), the measurement reporting evaluation is determined. Thus, the handover procedure is more suitable for the current actual service situation, thereby improving the handover effect.

Figure 6:
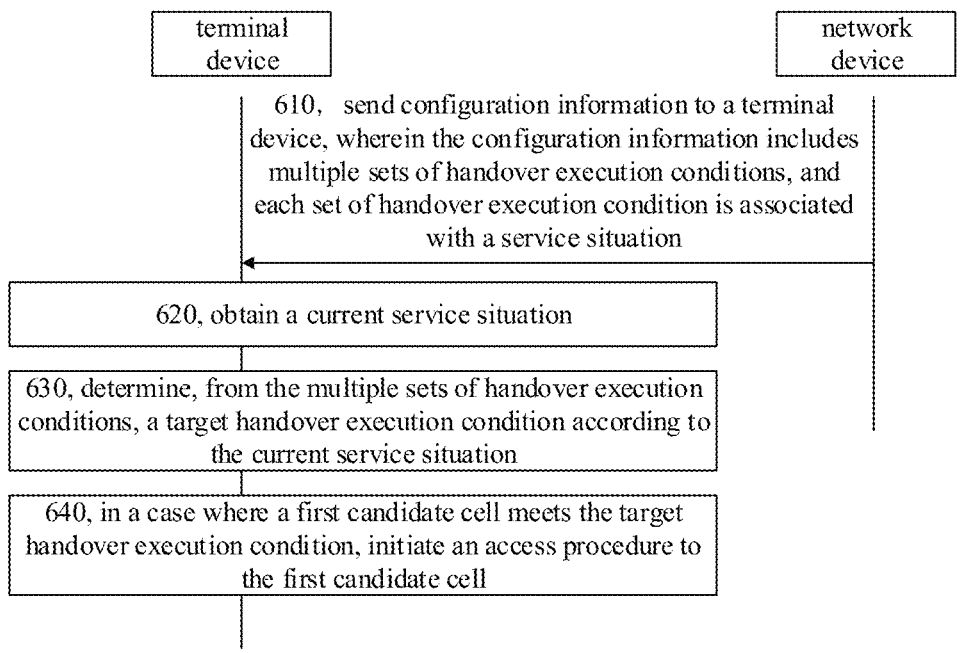
FIG. 6 is a flowchart of a handover method according to another embodiment of the present disclosure.

FIG. 6 is a flowchart of a handover method according to another embodiment of the present disclosure. The method may be applied to the network architecture shown in FIG. 1. The method may include the following steps (610~640):

In step 610, a network device sends configuration information to a terminal device. The configuration information includes multiple sets of handover execution conditions, and each set of handover execution condition(s) is associated with a service situation.

The handover execution condition(s) is(are) used to configure condition(s) that need to be met for triggering cell handover in the conditional handover scenario. For example, when a certain candidate cell meets a handover execution condition, the terminal device may directly initiate an access procedure to the cell.

Optionally, the configuration information includes configuration information of at least one candidate cell, and the configuration information of each candidate cell includes multiple sets of handover execution conditions. That is, for each candidate cell, the network device configures multiple sets of handover execution conditions, and subsequently the terminal device selects a handover execution condition that is suitable for the current service situation to decide whether to initiate an access procedure to the candidate cell.

Optionally, each handover execution condition may include a measurement event or a combination of multiple measurement events, that is, the handover execution condition is defined by the measurement event(s).

In addition, in an embodiment, each service situation may include a service type or a combination of multiple service types, or may also include a QoS characteristic or a combination of multiple QoS characteristics. For related descriptions, please refer to the implementations above, and repeated descriptions are omitted here.

Correspondingly, the terminal device receives configuration information from the network device.

In step 620, the terminal device obtains the current service situation.

In step 630, the terminal device determines a target handover execution condition from multiple sets of handover execution conditions according to the current service situation.

Optionally, the target handover execution condition is one set of handover execution condition(s) determined from the above multiple sets of handover execution conditions.

Optionally, the terminal device determines, among multiple sets of handover execution conditions, a handover execution condition associated with the current service situation as the target handover execution condition. In addition, if there is no handover execution condition associated with the current service situation, a handover execution condition with the highest degree of matching with the current service situation is determined as the target handover execution condition among multiple sets of handover execution conditions.

In step 640, the terminal device initiates an access procedure to a first candidate cell when the first candidate cell meets the target handover execution condition.

After the terminal device determines the target handover execution condition suitable for the current service situation from multiple sets of handover execution conditions, the terminal device may perform handover execution condition evaluation according to the target handover execution condition. When the first candidate cell meets the target handover execution condition, the terminal device initiates an access procedure to the first candidate cell. For example, the terminal device sends an access request to a network device of the first candidate cell, requesting access to the first candidate cell.

In view of the above, in the technical solutions provided by the embodiments of the present disclosure, for the conditional handover scenario, in combination with the current service situation of the terminal device (such as service type or service QoS characteristics), the terminal device determines the handover execution condition evaluation, so that the handover procedure is more suitable for the current actual service situation, thereby improving the handover effect.

Figure 7:
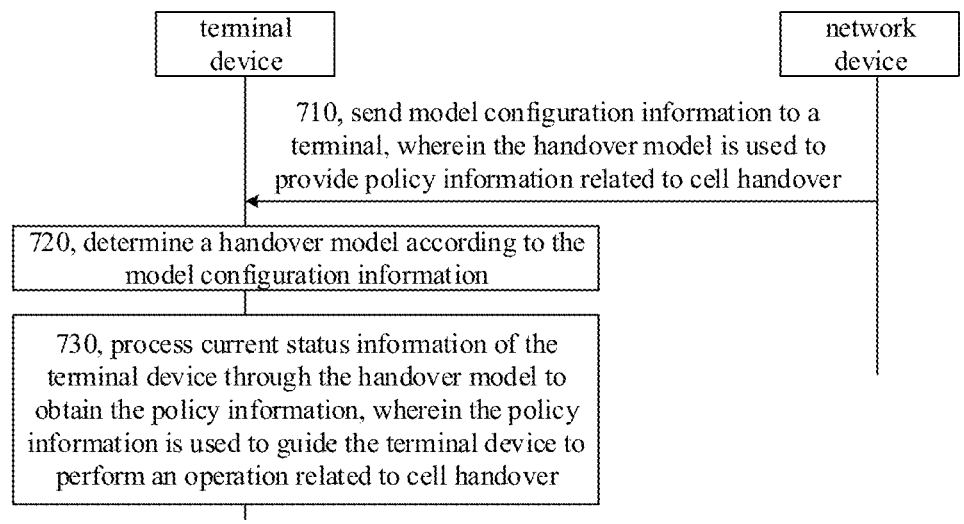
FIG. 7 is a flowchart of a handover method according to another embodiment of the present disclosure.

FIG. 7 is a flowchart of a handover method provided by another embodiment of the present disclosure. The method may be applied to the network architecture shown in FIG. 1. The method may include the following steps (710~730):

In step 710, a network device sends model configuration information for determining a handover model to the terminal device. The handover model is used for providing policy information related to cell handover.

In an embodiment of the present disclosure, appropriate policy information is output through the handover model to guide the terminal device to perform an operation related to cell handover.

Optionally, the handover model is a machine learning model constructed based on a neural network.

Figure 8:
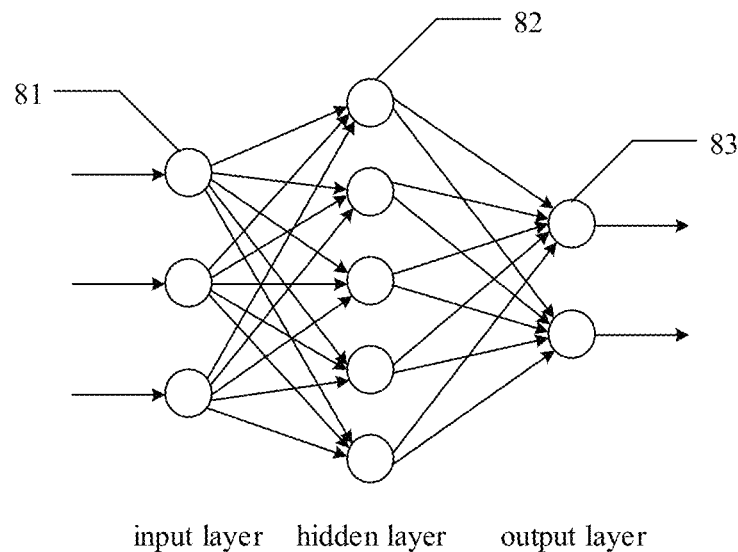
FIG. 8 is a schematic structural diagram of a simple neural network according to an embodiment of the present disclosure.

FIG. 8 shows a schematic diagram of the basic structure of a simple neural network. The neural network includes: an input layer 81, a hidden layer 82 and an output layer 83. The input layer 81 is responsible for receiving data, the hidden layer 82 processes the data, and the final result is generated at the output layer 83.

Figure 9:
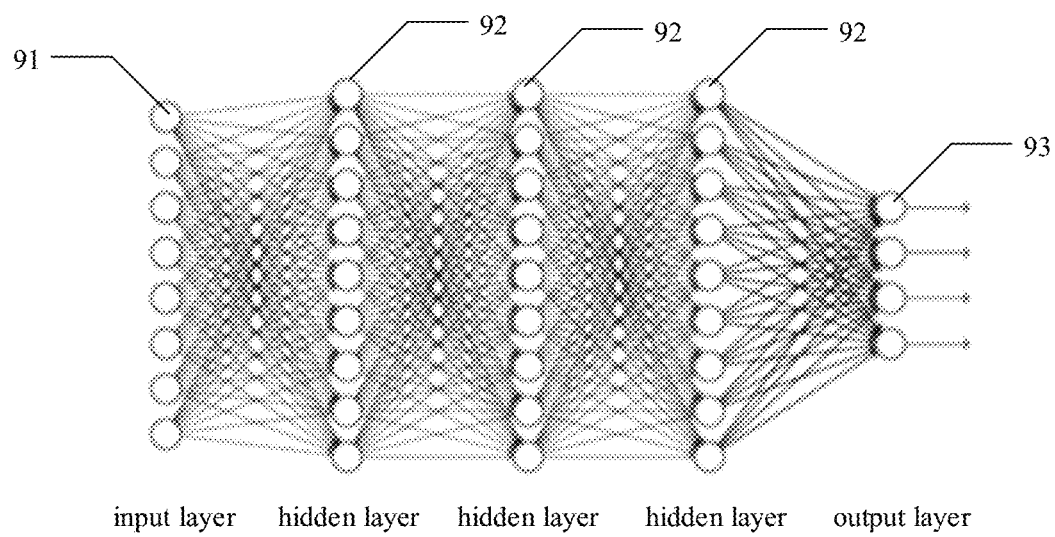
FIG. 9 is a schematic structural diagram of a deep neural network according to an embodiment of the present disclosure.

With the continuous developments of neural network research, a neural network deep learning algorithm has been proposed. FIG. 9 shows a schematic diagram of a basic structure of a deep neural network. The neural network includes an input layer 91, a plurality of hidden layers 92 and an output layer 93. The multi-hidden layer neural network structure greatly improves the processing capability of the network, and is widely used in pattern recognition, signal processing, optimization combination, anomaly detection, etc.

Figure 10:
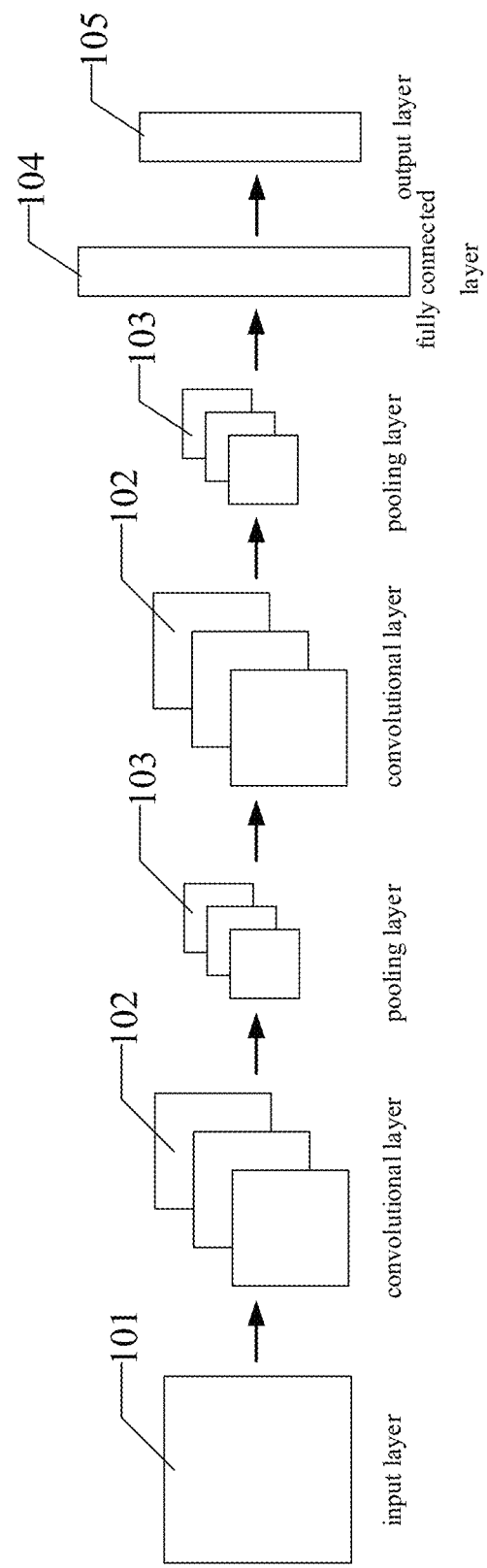
FIG. 10 is a schematic structural diagram of a convolutional neural network according to an embodiment of the present disclosure.

Likewise, with the developments of deep learning, convolutional neural networks have been further studied. As shown in FIG. 10, in a convolutional neural network, its basic structure includes: an input layer 101, multiple convolutional layers 102, multiple pooling layers 103, a fully connected layer 104 and an output layer 105. The introduction of the convolutional layers 102 and the pooling layers 103 effectively controls the sharp increase of network parameters, limits the number of parameters and explores the characteristics of the local structure, improving the robustness of the algorithm.

In embodiments of the present disclosure, the neural network structure adopted by the handover model is not limited, for example, it may be a simple neural network structure, or it may be relatively complicated network structure, such as CNN (Convolutional Neural Networks), DNN (Deep Neural Networks) and so on. Exemplarily, the handover model may also be a decision tree model, an SVM (Support Vector Machines) model, a K-means clustering model, etc., which is not limited in embodiments of the present disclosure.

In an example, the model configuration information includes a parameter of the handover model, for example, including the number of layers of the network included in the handover model, weight information in the network, bias information, and transfer function information of the network. Optionally, when the handover model is a convolutional neural network model, the parameter of the handover model may include the number of layers of the neural network, parameter information of each layer of the network, convolution kernel information, convolution kernel step size, pooling layer parameter and so on. The terminal device may construct a handover model according to parameter(s) of the handover model.

In another example, the model configuration information includes identity information of the handover model. The identity information is used to identify and distinguish different handover models. For example, the terminal device may pre-store or acquire multiple handover models and identity information of each handover model from the network device, and the terminal device may determine a handover model configured by the network device based on identity information given in the model configuration information.

Correspondingly, the terminal device receives the model configuration information from the network device.

Optionally, different cells correspond to different model configuration information. The network device sends the model configuration information corresponding to a cell where the network device is located to the terminal device. Correspondingly, the terminal device receives from the network device the model configuration information corresponding to the cell where the network device is located. That is, the network device can provide a locally adapted handover model to terminal device(s) in its cell, that is to say, a different handover model may be constructed and configured for each cell based on its own local feature(s).

In step 720, the terminal device determines the handover model according to the model configuration information.

For example, the terminal device constructs a handover model based on the parameter of the handover model, or determines the handover model based on the identity information of the handover model.

Optionally, the terminal device determines multiple handover models according to the model configuration information, and each handover model corresponds to a candidate cell. That is, the network device configures multiple handover models to the terminal device. A handover model corresponding to a certain candidate cell is used to provide policy information related to cell handover for the candidate cell. In this way, for different candidate cells, the terminal device may use different handover models to generate policy (policies), so that the finally generated policy information may be better adapted to the cell.

In step 730, the terminal device processes the current status information of the terminal device through the handover model to obtain policy information. The policy information is used to guide the terminal device to perform an operation related to cell handover.

For example, the terminal device may use the current status information as an input to the handover model, and the handover model outputs corresponding policy information.

For example, the policy information may include measurement policy information, and the measurement policy information is used to guide the terminal device to perform a measurement reporting operation related to cell handover. For another example, the policy information may include cell selection policy information, and the cell selection policy information is used to indicate a target cell for the terminal device to initiate access in a conditional handover scenario.

Optionally, the current status information of the terminal device includes at least one of the following: channel quality of the source cell, channel quality of a neighboring cell, channel quality change information of the source cell, channel quality change information of the neighboring cell, moving speed information of the terminal device, moving direction information of the terminal device, the current service status of the terminal device, and/or the QoS requirement corresponding to the current service status of the terminal device.

In addition, in the embodiments of the present disclosure, there is no limitation on the training manner of the handover model.

In view of the above, in the technical solutions provided by the embodiments of the present disclosure, a handover model is introduced. Based on the current status information of the terminal device, the handover model generates a local handover decision adapted to the terminal device, so that the handover procedure is more suitable for the current actual service situation, thereby improving the handover effect.

In addition, each cell can construct and is configured with different handover models based on its own local characteristic. After obtaining the handover model based on local characteristic, the terminal device combines current local actual information, such as a measurement result, speed information, service information, QoS information, etc., to generate the best handover decision that is currently adapted to local partial information. That is to say, in the above processes, the network device provides the local model(s), and the terminal device determines the local information as the input of the model(s), and the ultimate purpose is to generate a handover decision suitable for the actual scenario and service.

It has been introduced above that the policy information may include measurement policy information or cell selection policy information. The two cases will be described below through two embodiments shown in FIG. 11 and FIG. 12.

Figure 11:
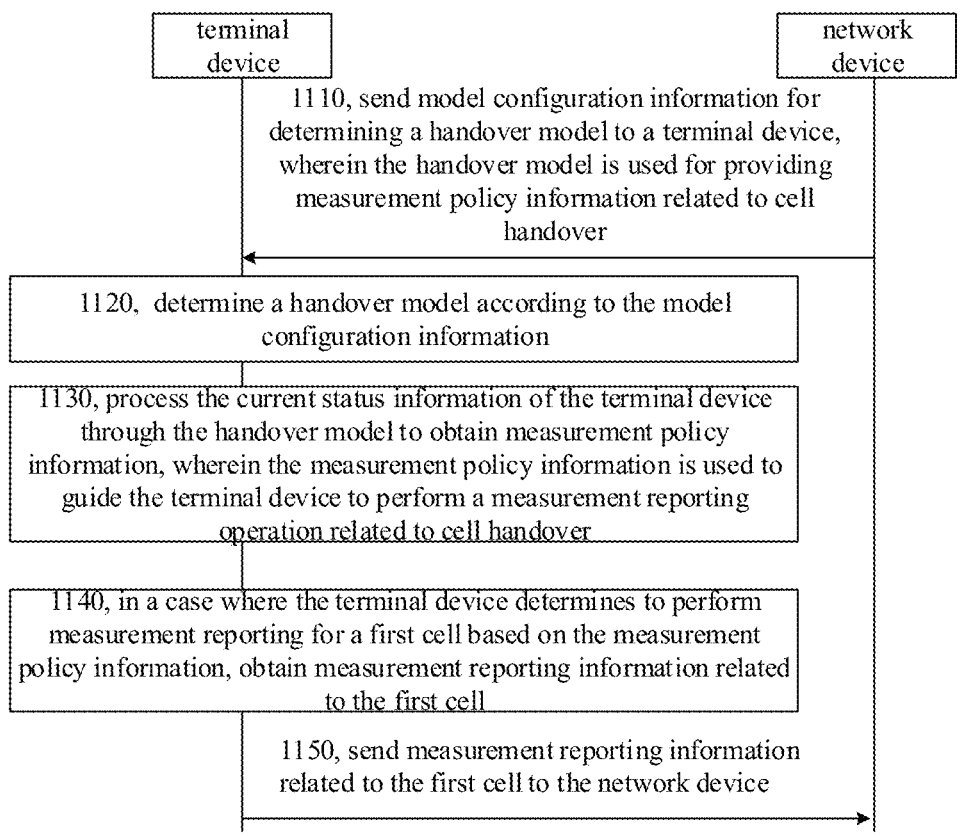
FIG. 11 is a flowchart of a handover method according to another embodiment of the present disclosure.

FIG. 11 shows a flowchart of a handover method according to another embodiment of the present disclosure. The method may be applied to the network architecture shown in FIG. 1. The method may include the following steps (1110~1150):

In step 1110, a network device sends model configuration information for determining a handover model to a terminal device. The handover model is used for providing measurement policy information related to cell handover.

In step 1120, the terminal device determines a handover model according to the model configuration information.

In step 1130, the terminal device processes the current status information of the terminal device through the handover model to obtain measurement policy information. The measurement policy information is used to guide the terminal device to perform a measurement reporting operation related to cell handover.

Optionally, the measurement policy information includes at least one cell for which measurement reporting is needed. Optionally, the measurement policy information further includes the priority of the at least one cell. For example, measurement reporting for a cell with a higher priority is performed preferentially.

In step 1140, in a case where the terminal device determines to perform measurement reporting for a first cell based on the measurement policy information, the terminal device obtains measurement report information related to the first cell.

In step 1150, the terminal device sends measurement reporting information related to the first cell to the network device.

In view of the above, in the technical solutions provided by the embodiments of the present disclosure, for a scenario handover is performed immediately after the measurement is reported, the technical solutions provide appropriate measurement policy information through the handover model combined with the current status information of the terminal device, so that the handover procedure is more suitable for the current actual service situation, thereby improving the handover effect.

Figure 12:
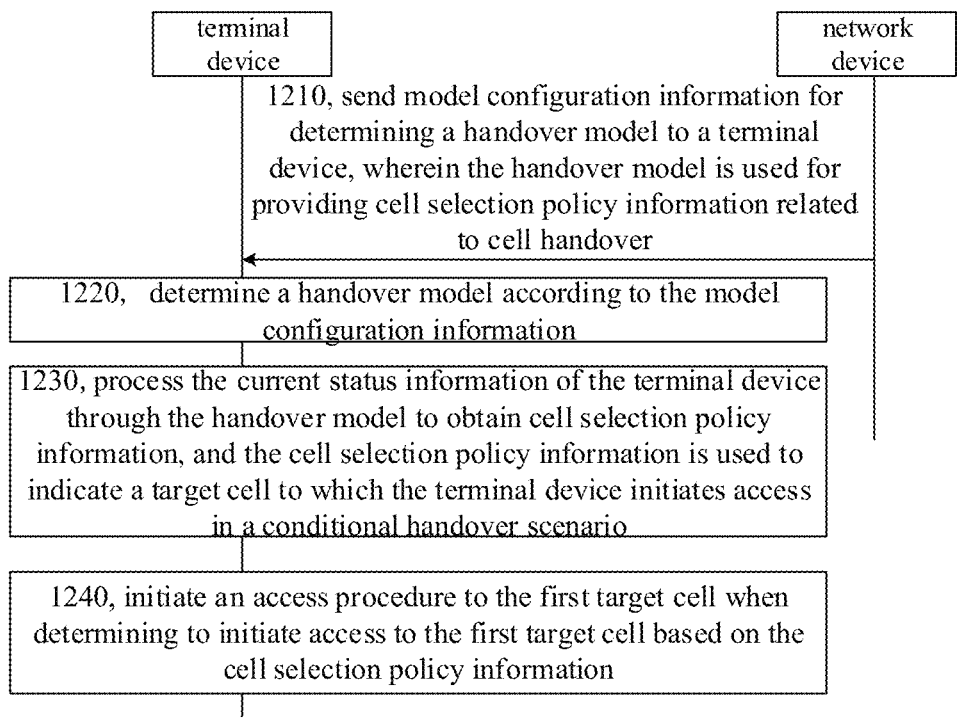
FIG. 12 is a flowchart of a handover method according to another embodiment of the present disclosure.

FIG. 12 shows a flowchart of a handover method according to another embodiment of the present disclosure. The method may be applied to the network architecture shown in FIG. 1. The method may include the following steps (1210~1240):

In step 1210, a network device sends model configuration information for determining a handover model to a terminal device. The handover model is used for providing cell selection policy information related to cell handover.

In step 1220, the terminal device determines a handover model according to the model configuration information.

In step 1230, the terminal device processes the current status information of the terminal device through the handover model to obtain cell selection policy information, and the cell selection policy information is used to indicate a target cell to which the terminal device initiates access in a conditional handover scenario.

Optionally, the cell selection policy information includes at least one target cell to which the terminal device initiates access. Optionally, the cell selection policy information further includes the priority of the at least one target cell. For example, the terminal device preferentially initiates an access procedure to a target cell with the highest priority.

In step 1240, the terminal device initiates an access procedure to the first target cell when determining to initiate access to the first target cell based on the cell selection policy information.

In view of the above, in the technical solutions provided by the embodiments of the present disclosure, for a conditional handover scenario, the technical solutions provide appropriate cell selection policy information through the handover model combined with the current status information of the terminal device, so that the handover procedure is more adapted to the current actual service situation, thereby improving the handover effect.

It should be noted that, in the foregoing method embodiments, the technical solutions of the present disclosure are introduced and described only from the perspective of interaction between the terminal device and the network device. The above-mentioned steps performed by the terminal device may be implemented independently as handover methods on the terminal device side, and the above-mentioned steps performed by the network device may be independently implemented as handover methods on the network device side.

The following are apparatus embodiments of the present disclosure, which may be used to implement the method embodiments of the present disclosure. For details not disclosed in the apparatus embodiments of the present disclosure, please refer to the method embodiments of the present disclosure.

Figure 13:
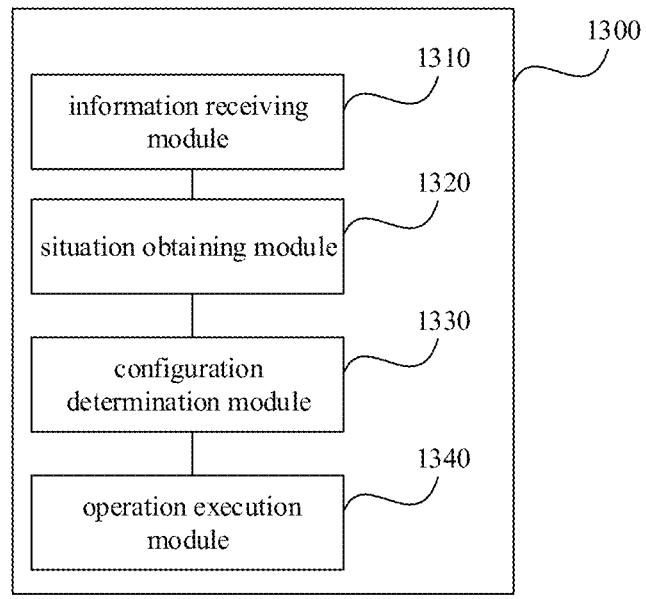
FIG. 13 is a block diagram of a handover apparatus according to an embodiment of the present disclosure.

FIG. 13 shows a block diagram of a handover apparatus according to an embodiment of the present disclosure. The apparatus has the functions of implementing the above example methods on the terminal device side, and the functions may be implemented by hardware, or may be implemented by executing corresponding software by the hardware. The apparatus may be the terminal device described above, or may be set in the terminal device. As shown in FIG. 13, the apparatus 1300 may include: an information receiving module 1310, a situation obtaining module 1320, a configuration determination module 1330 and an operation execution module 1340.

The information receiving module 1310 is configured to receive configuration information from a network device, wherein the configuration information includes multiple sets of handover configuration information, each set of the multiple sets of handover configuration information is associated with a service situation, and the handover configuration information is used to configure an operation related to cell handover.

The situation obtaining module 1320 is configured to obtain a current service situation.

The configuration determination module 1330 is configured to determine, from the multiple sets of handover configuration information, target handover configuration information according to the current service situation.

The operation execution module 1340 is configured to perform the operation related to cell handover according to the target handover configuration information.

In an example embodiment, each service situation includes a service type or a combination of multiple service types.

In an example embodiment, the service type includes at least one of the following: an eMBB service, a URLLC service, and a mMTC service.

In an example embodiment, each service situation includes a QoS characteristic or a combination of multiple QoS characteristics.

In an example embodiment, each set of the multiple sets of handover configuration information includes measurement configuration information, and the measurement configuration information is used to configure a measurement reporting operation of the terminal device.

In an example embodiment, the measurement configuration information includes a measurement event, and the measurement event is used to indicate an event which needs to be met for performing the measurement reporting operation.

In an example embodiment, the target handover configuration information includes target measurement configuration information;
  wherein the operation execution module 1340 is configured to:
    in a case where a first cell meets the target measurement configuration information, send measurement reporting information related to the first cell to the network device.

In an example embodiment, each set of the multiple sets of handover configuration information includes a handover execution condition, and the handover execution condition is used to configure a condition which needs to be met for triggering cell handover in a conditional handover scenario.

In an example embodiment, the configuration information includes configuration information for at least one candidate cell, and the configuration information for each candidate cell includes multiple sets of handover execution conditions.

In an example embodiment, the target handover configuration information includes a target handover execution condition;
  wherein the operation execution module 1340 is configured to:
    initiate an access procedure to a first candidate cell in a case where the first candidate cell meets the target handover execution condition.

In an example embodiment, the configuration determination module 1330 is configured to:
  determine, from the multiple sets of handover configuration information, handover configuration information associated with the current service situation as the target handover configuration information.

In an example embodiment, the configuration determination module 1330 is further configured to:
  in a case where there is no handover configuration information associated with the current service situation, determine, from the multiple sets of handover configuration information, handover configuration information with the highest degree of matching with the current service situation as the target handover configuration information.

Figure 14:
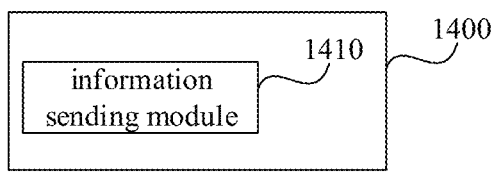
FIG. 14 is a block diagram of a handover apparatus according to another embodiment of the present disclosure.

FIG. 14 shows a block diagram of a handover apparatus according to another embodiment of the present disclosure. The apparatus has the functions of implementing the above example methods on the network device side, and the functions may be implemented by hardware, or may be implemented by executing corresponding software by the hardware. The apparatus may be the network device described above, or may be set in the network device. As shown in FIG. 14, the apparatus 1400 may include: an information sending module 1410.

The information sending module 1410 is configured to send configuration information to a terminal device, wherein the configuration information includes multiple sets of handover configuration information, each set of the multiple sets of handover configuration information is associated with a service situation, and the handover configuration information is used to configure an operation related to cell handover.

In an example embodiment, each service situation includes a service type or a combination of multiple service types.

In an example embodiment, the service type comprises at least one of the following: an eMBB) service, a URLLC service, and a mMT) service.

In an example embodiment, each service situation includes a Quality of Service (QoS) characteristic or a combination of multiple QoS characteristics.

In an example embodiment, wherein each set of the multiple sets of handover configuration information includes measurement configuration information, and the measurement configuration information is used to configure a measurement reporting operation of the terminal device.

In an example embodiment, the measurement configuration information includes a measurement event, and the measurement event is used to indicate an event which needs to be met for performing the measurement reporting operation.

In an example embodiment, each set of the multiple sets of handover configuration information includes a handover execution condition, and the handover execution condition is used to configure a condition which needs to be met for triggering cell handover in a conditional handover scenario.

In an example embodiment, the configuration information includes configuration information for at least one candidate cell, and the configuration information for each candidate cell includes multiple sets of handover execution conditions.

Figure 15:
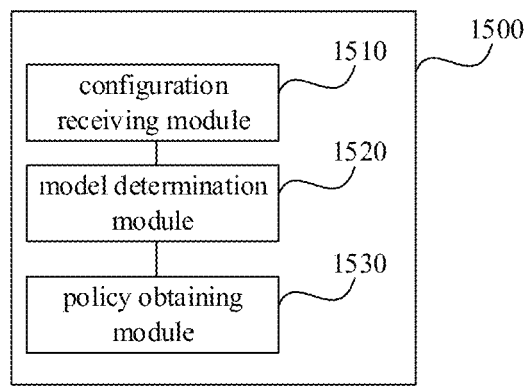
FIG. 15 is a block diagram of a handover apparatus according to another embodiment of the present disclosure.

FIG. 15 shows a block diagram of a handover apparatus according to another embodiment of the present disclosure. The apparatus has the functions of implementing the above example methods on the terminal device side, and the functions may be implemented by hardware, or may be implemented by executing corresponding software by the hardware. The apparatus may be the terminal device described above, or may be set in the terminal device. As shown in FIG. 15, the apparatus 1500 may include: a configuration receiving module 1510, a model determination module 1520 and a policy obtaining module 1530.

The configuration receiving module 1510 is configured to receive model configuration information from a network device.

The model determination module 1520 is configured to determine a handover model according to the model configuration information, wherein the handover model is used to provide policy information related to cell handover.

The policy obtaining module 1530 is configured to process current status information of the terminal device through the handover model to obtain the policy information, wherein the policy information is used to guide the terminal device to perform an operation related to cell handover.

In an example embodiment, the policy information includes measurement policy information, and the measurement policy information is used to guide the terminal device to perform a measurement reporting operation related to cell handover.

In an example embodiment, the measurement policy information includes at least one cell for which measurement reporting is needed.

In an example embodiment, the measurement policy information further includes a priority of the at least one cell.

In an example embodiment, the apparatus 1500 further includes a measurement reporting module (not shown in FIG. 15) configured to:
  in a case where it is determined to perform measurement reporting for a first cell based on the measurement policy information, obtain measurement reporting information related to the first cell; and send the measurement reporting information related to the first cell to the network device.

In an example embodiment, the policy information includes cell selection policy information, and the cell selection policy information is used to indicate a target cell for the terminal device to initiate access in a conditional handover scenario.

In an example embodiment, the cell selection policy information includes at least one target cell to which the terminal device initiates access.

In an example embodiment, the cell selection policy information further includes a priority of the at least one target cell.

In an example embodiment, the apparatus 1500 further includes an access initiating module (not shown in FIG. 15) configured to:
  initiate an access procedure to a first target cell in a case where it is determined to initiate access to the first target cell based on the cell selection policy information.

In an example embodiment, the current status information of the terminal device includes at least one of the following:
  a channel quality of a source cell, a channel quality of a neighboring cell, channel quality change information of the source cell, channel quality change information of the neighboring cell, moving speed information of the terminal device, moving direction information of the terminal device, a current service situation of the terminal device, and a QoS requirement corresponding to the current service situation of the terminal device.

In an example embodiment, the model determination module 1520 is configured to:
  determine a plurality of handover models according to the model configuration information, each handover model corresponding to a candidate cell;
  wherein the handover model corresponding to the candidate cell is used to provide policy information related to cell handover for the candidate cell.

In an example embodiment, different cells correspond to different model configuration information;
  wherein the configuration receiving module 1510 is configured to:
  receive model configuration information corresponding to a cell where the network device is located from the network device.

In an example embodiment, the model configuration information includes a parameter of the handover model.

In an example embodiment, the handover model is a machine learning model constructed based on a neural network.

Figure 16:
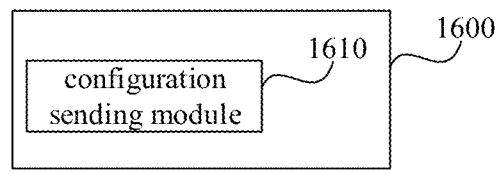
FIG. 16 is a block diagram of a handover apparatus according to another embodiment of the present disclosure.

FIG. 16 shows a block diagram of a handover apparatus according to another embodiment of the present disclosure. The apparatus has the functions of implementing the above example methods on the network device side, and the functions may be implemented by hardware, or may be implemented by executing corresponding software by the hardware. The apparatus may be the network device described above, or may be set in the network device. As shown in FIG. 16, the apparatus 1600 may include: a configuration sending module 1610.

The configuration sending module 1610 is configured to send, to a terminal device, model configuration information which is used to determine a handover model, wherein the handover model is used to provide policy information related to cell handover, and the policy information is used to guide the terminal device to perform an operation related to cell handover.

In an example embodiment, the policy information includes measurement policy information, and the measurement policy information is used to guide the terminal device to perform a measurement reporting operation related to cell handover.

In an example embodiment, the measurement policy information includes at least one cell for which measurement reporting is needed.

In an example embodiment, the measurement policy information further includes a priority of the at least one cell.

In an example embodiment, the policy information includes cell selection policy information, and the cell selection policy information is used to indicate a target cell for the terminal device to initiate access in a conditional handover scenario.

In an example embodiment, the cell selection policy information includes at least one target cell to which the terminal device initiates access.

In an example embodiment, the cell selection policy information further includes a priority of the at least one target cell.

In an example embodiment, an input of the handover model includes current status information of the terminal device;
  wherein the current status information of the terminal device includes at least one of the following:
  a channel quality of a source cell, a channel quality of a neighboring cell, channel quality change information of the source cell, channel quality change information of the neighboring cell, moving speed information of the terminal device, moving direction information of the terminal device, a current service situation of the terminal device, and a QoS requirement corresponding to the current service situation of the terminal device.

In an example embodiment, the model configuration information is used to determine a plurality of handover models, and each handover model corresponds to a candidate cell;
  wherein the handover model corresponding to the candidate cell is used to provide policy information related to cell handover for the candidate cell.

In an example embodiment, different cells correspond to different model configuration information;
  the configuration sending module 1610 is configured to:
  send, to the terminal device, model configuration information corresponding to a cell where the network device is located.
  the model configuration information includes a parameter of the handover model.

In an example embodiment, the handover model is a machine learning model constructed based on a neural network.

It should be noted that when the apparatuses provided by the above embodiments realize their functions, the division of the above-mentioned functional modules is used as an example for illustration. In practical applications, the above-mentioned function allocation may be completed by different functional modules according to actual needs. That is, the inner structure of the devices is divided into different functional modules to implement all or part of the functions described above.

Regarding the apparatuses in the foregoing embodiments, the specific manner in which each module executes operations has been described in detail in the embodiments related to the methods, and repeated descriptions will be omitted here.

Figure 17:
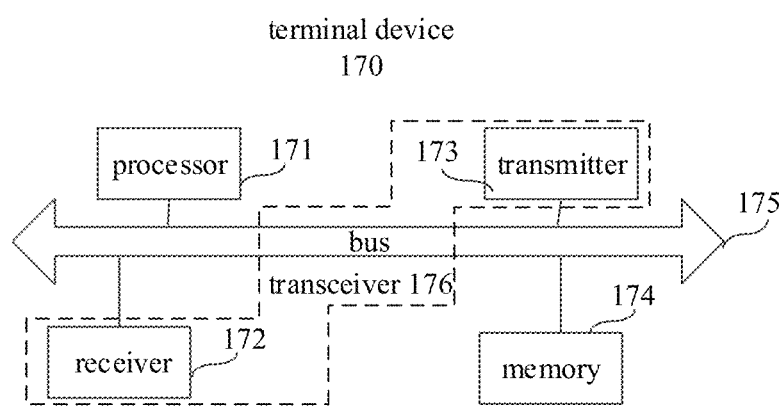
FIG. 17 is a schematic structural diagram of a terminal device according to an embodiment of the present disclosure.

FIG. 17 shows a schematic structural diagram of a terminal device 170 according to an embodiment of the present disclosure. The terminal device 170 may include: a processor 171, a receiver 172, a transmitter 173, a memory 174 and a bus 175.

The processor 171 includes one or more processing cores, and the processor 171 executes various functional applications and information processing by running software programs and modules.

The receiver 172 and the transmitter 173 may be implemented as a transceiver 176, which may be a communication chip.

The memory 174 is connected to the processor 171 through the bus 175.

The memory 174 may be used to store a computer program, and the processor 171 is used to execute the computer program, so as to implement various steps performed by the terminal device in the foregoing method embodiments.

In addition, the memory 174 can be implemented by any type of volatile or non-volatile storage device or their combination. The volatile or non-volatile storage device includes but not limited to: Random-Access Memory (RAM) and Read-Only Memory (ROM), Erasable Programmable Read-Only Memory (EPROM), Electrically Erasable Programmable Read-Only Memory (EEPROM), flash memory or other solid-state storage technology, Compact Disc Read-Only Memory (CD-ROM), Digital Video Disc (high-density digital video disc, DVD) or other optical storage, tape cartridge, tape, disk storage or other magnetic storage device.

In a technical solution, the transceiver 176 is configured to receive configuration information from a network device, wherein the configuration information includes multiple sets of handover configuration information, each set of the multiple sets of handover configuration information is associated with a service situation, and the handover configuration information is used to configure an operation related to cell handover.

The processor 171 is configured to:
obtain a current service situation;
determine, from the multiple sets of handover configuration information, target handover configuration information according to the current service situation; and
perform the operation related to cell handover according to the target handover configuration information.

In an example embodiment, each service situation includes a service type or a combination of multiple service types.

In an example embodiment, the service type includes at least one of the following: an eMBB service, a URLLC service, and a mMTC service.

In an example embodiment, each service situation includes a QoS characteristic or a combination of multiple QoS characteristics.

In an example embodiment, each set of the multiple sets of handover configuration information includes measurement configuration information, and the measurement configuration information is used to configure a measurement reporting operation of the terminal device.

In an example embodiment, the measurement configuration information includes a measurement event, and the measurement event is used to indicate an event which needs to be met for performing the measurement reporting operation.

In an example embodiment, the target handover configuration information includes target measurement configuration information;
the processor 171 is configured to:
in a case where a first cell meets the target measurement configuration information, send measurement reporting information related to the first cell to the network device.

In an example embodiment, each set of the multiple sets of handover configuration information includes a handover execution condition, and the handover execution condition is used to configure a condition which needs to be met for triggering cell handover in a conditional handover scenario.

In an example embodiment, the configuration information includes configuration information for at least one candidate cell, and the configuration information for each candidate cell includes multiple sets of handover execution conditions.

In an example embodiment, the target handover configuration information includes a target handover execution condition;
the processor 171 is configured to:
initiate an access procedure to a first candidate cell in a case where the first candidate cell meets the target handover execution condition.

In an example embodiment, the processor 171 is configured to:
determine, from the multiple sets of handover configuration information, handover configuration information associated with the current service situation as the target handover configuration information.

In an example embodiment, the processor 171 is further configured to:
in a case where there is no handover configuration information associated with the current service situation, determine, from the multiple sets of handover configuration information, handover configuration information with the highest degree of matching with the current service situation as the target handover configuration information.

In another technical solution, the transceiver 176 is configured to receive model configuration information from a network device;
The processor 171 is configured to:
determine a handover model according to the model configuration information, wherein the handover model is used to provide policy information related to cell handover; and
process current status information of the terminal device through the handover model to obtain the policy information, wherein the policy information is used to guide the terminal device to perform an operation related to cell handover.

In an example embodiment, the policy information includes measurement policy information, and the measurement policy information is used to guide the terminal device to perform a measurement reporting operation related to cell handover.

In an example embodiment, the measurement policy information includes at least one cell for which measurement reporting is needed.

In an example embodiment, the measurement policy information further includes a priority of the at least one cell.

In an example embodiment, the processor 171 is further configured to: in a case where it is determined to perform measurement reporting for a first cell based on the measurement policy information, obtain measurement reporting information related to the first cell;

the transceiver 176 is further configured to send the measurement reporting information related to the first cell to the network device.

In an example embodiment, the policy information includes cell selection policy information, and the cell selection policy information is used to indicate a target cell for the terminal device to initiate access in a conditional handover scenario.

In an example embodiment, the cell selection policy information includes at least one target cell to which the terminal device initiates access.

In an example embodiment, the cell selection policy information further includes a priority of the at least one target cell.

In an example embodiment, the transceiver 176 is further configured to initiate an access procedure to a first target cell in a case where it is determined to initiate access to the first target cell based on the cell selection policy information.

In an example embodiment, the current status information of the terminal device includes at least one of the following: a channel quality of a source cell, a channel quality of a neighboring cell, channel quality change information of the source cell, channel quality change information of the neighboring cell, moving speed information of the terminal device, moving direction information of the terminal device, a current service situation of the terminal device, and a QoS requirement corresponding to the current service situation of the terminal device.

In an example embodiment, the processor 171 is configured to: determine a plurality of handover models according to the model configuration information, each handover model corresponding to a candidate cell;

wherein the handover model corresponding to the candidate cell is used to provide policy information related to cell handover for the candidate cell.

In an example embodiment, different cells correspond to different model configuration information;

The transceiver 176 is configured to: receive model configuration information corresponding to a cell where the network device is located from the network device.

In an example embodiment, the model configuration information includes a parameter of the handover model.

In an example embodiment, the handover model is a machine learning model constructed based on a neural network.

Figure 18:
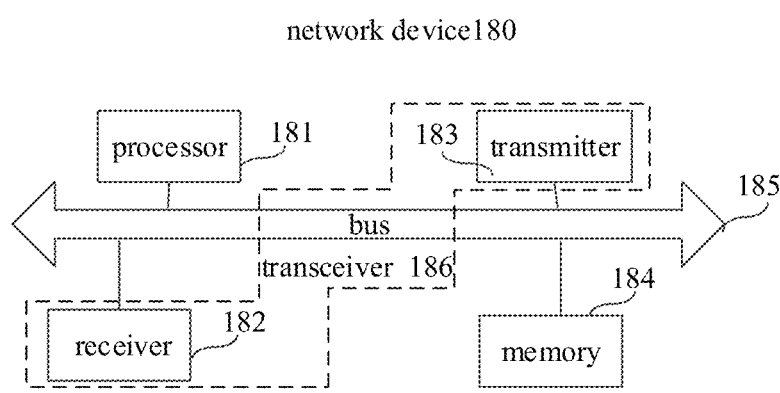
FIG. 18 is a schematic structural diagram of a network device according to an embodiment of the present disclosure.

FIG. 18 shows a schematic structural diagram of a network device 180 according to an embodiment of the present disclosure. The network device 180 may include: a processor 181, a receiver 182, a transmitter 183, a memory 184 and a bus 185.

The processor 181 includes one or more processing cores, and the processor 181 executes various functional applications and information processing by running software programs and modules.

The receiver 182 and the transmitter 183 may be implemented as a transceiver 186, which may be a communication chip.

The memory 184 is connected to the processor 181 through the bus 185.

The memory 184 may be used to store a computer program, and the processor 181 is used to execute the computer program, so as to implement various steps performed by the network device in the foregoing method embodiments.

In addition, the memory 184 can be implemented by any type of volatile or non-volatile storage device or their combination. The volatile or non-volatile storage device includes but not limited to: Random-Access Memory (RAM) and Read-Only Memory (ROM), Erasable Programmable Read-Only Memory (EPROM), Electrically Erasable Programmable Read-Only Memory (EEPROM), flash memory or other solid-state storage technology, Compact Disc Read-Only Memory (CD-ROM), Digital Video Disc (high-density digital video disc, DVD) or other optical storage, tape cartridge, tape, disk storage or other magnetic storage device.

In a technical solution, the transceiver 186 is configured to send configuration information to a terminal device, wherein the configuration information includes multiple sets of handover configuration information, each set of the multiple sets of handover configuration information is associated with a service situation, and the handover configuration information is used to configure an operation related to cell handover.

In an example embodiment, each service situation comprises a service type or a combination of multiple service types.

In an example embodiment, the service type comprises at least one of the following: an eMBB service, a URLLC service, and a mMTC service.

In an example embodiment, each service situation includes a Quality of Service (QoS) characteristic or a combination of multiple QoS characteristics.

In an example embodiment, each set of the multiple sets of handover configuration information includes measurement configuration information, and the measurement configuration information is used to configure a measurement reporting operation of the terminal device.

In an example embodiment, the measurement configuration information includes a measurement event, and the measurement event is used to indicate an event which needs to be met for performing the measurement reporting operation.

In an example embodiment, each set of the multiple sets of handover configuration information includes a handover execution condition, and the handover execution condition is used to configure a condition which needs to be met for triggering cell handover in a conditional handover scenario.

In an example embodiment, the configuration information includes configuration information for at least one candidate cell, and the configuration information for each candidate cell includes multiple sets of handover execution conditions.

In another technical solution, the transceiver 186 is configured to send, to a terminal device, model configuration information which is used to determine a handover model, wherein the handover model is used to provide policy information related to cell handover, and the policy information is used to guide the terminal device to perform an operation related to cell handover.

In an example embodiment, the policy information includes measurement policy information, and the measurement policy information is used to guide the terminal device to perform a measurement reporting operation related to cell handover.

In an example embodiment, the measurement policy information includes at least one cell for which measurement reporting is needed.

In an example embodiment, the measurement policy information further includes a priority of the at least one cell.

In an example embodiment, the policy information includes cell selection policy information, and the cell selection policy information is used to indicate a target cell for the terminal device to initiate access in a conditional handover scenario.

In an example embodiment, the cell selection policy information includes at least one target cell to which the terminal device initiates access.

In an example embodiment, the cell selection policy information further includes a priority of the at least one target cell.

In an example embodiment, an input of the handover model includes current status information of the terminal device;
- wherein the current status information of the terminal device includes at least one of the following:
- a channel quality of a source cell, a channel quality of a neighboring cell, channel quality change information of the source cell, channel quality change information of the neighboring cell, moving speed information of the terminal device, moving direction information of the terminal device, a current service situation of the terminal device, and a QoS requirement corresponding to the current service situation of the terminal device.

In an example embodiment, the model configuration information is used to determine a plurality of handover models, and each handover model corresponds to a candidate cell;
- wherein the handover model corresponding to the candidate cell is used to provide policy information related to cell handover for the candidate cell.

In an example embodiment, different cells correspond to different model configuration information;
- the transceiver 186 is configured to:
- send, to the terminal device, model configuration information corresponding to a cell where the network device is located.

In an example embodiment, the model configuration information includes a parameter of the handover model.

In an example embodiment, the handover model is a machine learning model constructed based on a neural network.

An embodiment of the present disclosure further provides a computer-readable storage medium. A computer program is stored in the storage medium. The computer program is configured to be executed by a processor of a terminal device, so as to implement the foregoing handover methods on the terminal device side.

An embodiment of the present disclosure further provides a computer-readable storage medium. A computer program is stored in the storage medium. The computer program is configured to be executed by a processor of a network device, so as to implement the foregoing handover methods on the network device side.

An embodiment of the present disclosure also provides a chip. The chip includes a programmable logic circuit and/or program instructions. When the chip runs on the terminal device, the terminal device is caused to implement the above-mentioned handover methods on the terminal device side.

An embodiment of the present disclosure also provides a chip. The chip includes a programmable logic circuit and/or program instructions. When the chip runs on the network device, the network device is caused to implement the above-mentioned handover methods on the network device side.

An embodiment of the present disclosure further provides a computer program product. When the computer program product is run on a processor of a terminal device, the terminal device is caused to implement the foregoing handover methods on the terminal device side.

An embodiment of the present disclosure further provides a computer program product. When the computer program product is run on a processor of a network device, the network device is caused to implement the foregoing handover methods on the network device side.

Those skilled in the art should be aware that, in the foregoing one or more examples, the functions described in the embodiments of the present disclosure may be implemented by hardware, software, firmware or any combination thereof. When implemented in software, the functions may be stored in a computer-readable medium or transmitted over as one or more instructions or codes on a computer-readable medium. The computer-readable medium includes both computer storage medium and communication medium. The communication medium includes any medium that facilitates transfer of a computer program from one place to another. A storage medium may be any available medium that can be accessed by a general purpose or special purpose computer.

The above are only example embodiments of the present disclosure, and are not intended to limit the present disclosure. Any modifications, equivalent replacements, improvements, etc. made within the spirit and principles of the present disclosure fall within the scope of protection of the present disclosure.

What is claimed is:

1. A handover method, applied to a terminal device, and the method comprising:
- receiving configuration information from a network device, wherein the configuration information comprises multiple sets of handover configuration information, each set of the multiple sets of handover configuration information is associated with a service situation, and the handover configuration information is used to configure an operation related to cell handover;
- obtaining a current service situation;
- determining, from the multiple sets of handover configuration information, target handover configuration information according to the current service situation; and
- performing the operation related to cell handover according to the target handover configuration information;
- wherein in response to no handover configuration information being associated with the current service situation, handover configuration information with the highest degree of matching with the current service situation from the multiple sets of handover configuration information is determined as the target handover configuration information.

2. The method according to claim 1, wherein each service situation comprises a service type or a combination of multiple service types.

3. The method according to claim 2, wherein the service type comprises at least one of the following: an Enhanced Mobile Broadband (eMBB) service, an Ultra-reliable and Low Latency Communication (URLLC) service, and a Massive Machine Type Communication (mMTC) service.

4. The method according to claim 1, wherein each service situation comprises a Quality of Service (QoS) characteristic or a combination of multiple QoS characteristics.

5. The method according to claim 1, wherein each set of the multiple sets of handover configuration information comprises measurement configuration information, and the measurement configuration information is used to configure a measurement reporting operation of the terminal device.

6. The method according to claim 5, wherein the measurement configuration information comprises a measurement event, and the measurement event is used to indicate an event which needs to be met for performing the measurement reporting operation.

7. The method according to claim 5, wherein the target handover configuration information comprises target measurement configuration information;
wherein performing the operation related to cell handover according to the target handover configuration information comprises:
in response to a first cell meeting the target measurement configuration information, sending measurement reporting information related to the first cell to the network device.

8. The method according to claim 1, wherein each set of the multiple sets of handover configuration information comprises a handover execution condition, and the handover execution condition is used to configure a condition which needs to be met for triggering cell handover in a conditional handover scenario.

9. The method according to claim 8, wherein the configuration information comprises configuration information for at least one candidate cell, and the configuration information for each candidate cell comprises multiple sets of handover execution conditions.

10. The method according to claim 8, wherein the target handover configuration information comprises a target handover execution condition;
wherein performing the operation related to cell handover according to the target handover configuration information comprises:
initiating an access procedure to a first candidate cell in response to the first candidate cell meeting the target handover execution condition.

11. The method according to claim 1, wherein determining, from the multiple sets of handover configuration information, the target handover configuration information according to the current service situation comprises:
determining, from the multiple sets of handover configuration information, the handover configuration information associated with the current service situation as the target handover configuration information.

12. A terminal device, comprising:
a processor; and
a memory storing instructions executable by the processor;
wherein when the instructions are executed by the processor, the terminal device is caused to:
receive configuration information from a network device, wherein the configuration information comprises multiple sets of handover configuration information, each set of the multiple sets of handover configuration information is associated with a service situation, and the handover configuration information is used to configure an operation related to cell handover;
obtain a current service situation;
determine, from the multiple sets of handover configuration information, target handover configuration information according to the current service situation; and perform the operation related to cell handover according to the target handover configuration information;
wherein in response to no handover configuration information being associated with the current service situation, handover configuration information with the highest degree of matching with the current service situation from the multiple sets of handover configuration information is determined as the target handover configuration information.

13. The terminal device according to claim 12, wherein each service situation comprises a service type or a combination of multiple service types.

14. The terminal device according to claim 12, wherein each service situation comprises a Quality of Service (QoS) characteristic or a combination of multiple QoS characteristics.

15. The terminal device according to claim 12, wherein when the instructions are executed by the processor, the terminal device is caused to:
determine, from the multiple sets of handover configuration information, the handover configuration information associated with the current service situation as the target handover configuration information.

16. A network device, comprising:
a processor; and
a memory storing instructions executable by the processor;
wherein when the instructions are executed by the processor, the network device is caused to:
send configuration information to a terminal device, wherein the configuration information comprises multiple sets of handover configuration information, each set of the multiple sets of handover configuration information is associated with a service situation, and the handover configuration information is used to configure an operation related to cell handover;
wherein the multiple sets of handover configuration information is used for the terminal device to determine, from the multiple sets of handover configuration information, target handover configuration information according to the current service situation, and perform the operation related to cell handover according to the target handover configuration information;
wherein in response to no handover configuration information being associated with the current service situation, handover configuration information with the highest degree of matching with the current service situation from the multiple sets of handover configuration information is determined as the target handover configuration information.

17. The network device according to claim 16, wherein each service situation comprises a service type or a combination of multiple service types.

18. The network device according to claim 16, wherein each service situation comprises a Quality of Service (QoS) characteristic or a combination of multiple QoS characteristics.

* * * * *